(No Model.)

T. F. LEMASSENA.
TOP PROP.

No. 314,587. Patented Mar. 31, 1885.

Attest:
Henry J. Theberath
D. Lee.

Inventor.
Thos. F. Lemassena, per
Thos. S. Crane, Atty.

UNITED STATES PATENT OFFICE.

THEODORE F. LEMASSENA, OF NEWARK, NEW JERSEY, ASSIGNOR TO LILLIAN LEMASSENA, OF SAME PLACE.

TOP-PROP.

SPECIFICATION forming part of Letters Patent No. 314,587, dated March 31, 1885.

Application filed September 15, 1884. (No model.)

*To all whom it may concern:*

Be it known that I, THEO. F. LEMASSENA, a citizen of the United States, residing in Newark, Essex county, New Jersey, have invented certain new and useful Improvements in Paper Top-Props, fully described and represented in the following specification and accompanying drawings, forming a part of the same.

This invention consists, first, in a top-prop formed of paper-pulp or vegetable fibers united by suitable cement; and, secondly, in a modification of the same mixed with rubber cement and then vulcanized, so as to form a partly-elastic composition.

The composition of which I form the prop consists of paper-pulp or any equivalent vegetable fibers mixed with suitable cement—as glue, mucilage, dissolved india-rubber, or copal varnish—and is pressed to the desired form in a mold, so that the article is made by a very simple process, and is ready for use when dried and coated with any desirable paint, varnish, or japan.

Figure 1:
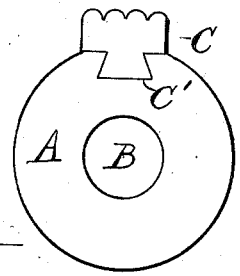
Figure 2:
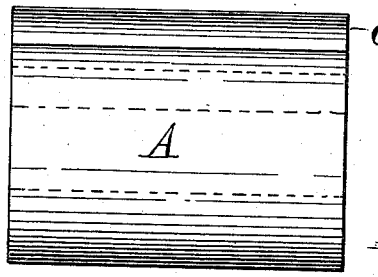
Figure 3:
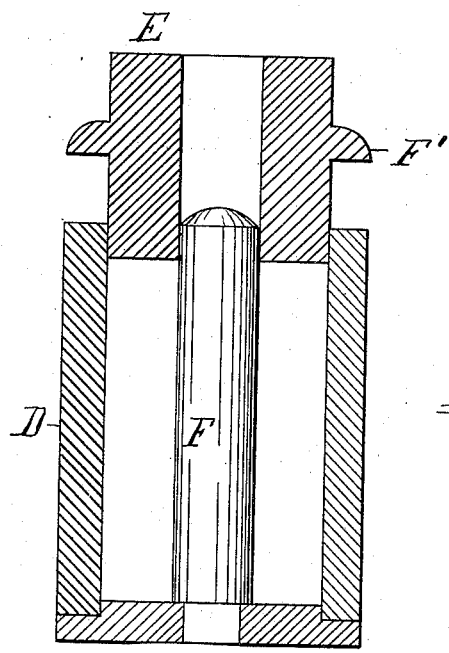
Figure 4:
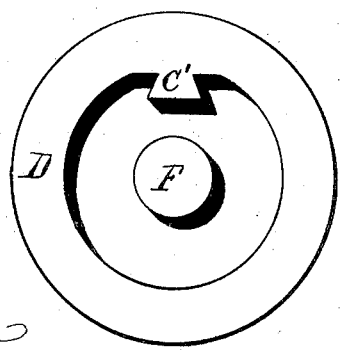

In the drawings annexed, Figure 1 is an end view, and Fig. 2 a side view, of a top-prop representing my invention; and Figs. 3 and 4 are respectively a plan and vertical section of a mold for making such prop.

A is the body of the prop, B the central hole by which the same is secured on the stud at the carriage-side, and C the seat which receives the impact of the carriage-bows. D is the mold, E the follower, and F a central pin to form the hole B.

The composition is placed in the mold around the pin F in sufficient quantity to form a top-prop of the desired length, when compressed, and the follower is placed over the pin and forced into the mold until the required consolidation of the mass is produced. If desired, the follower may be formed with a collar, as F', adapted to strike the top of the mold at a fixed point, and thus secure uniformity in the length of the props when molded. The mold is preferably greased before using, to prevent the glue, paste, or composition from adhering to the sides of the mold, and the bottom of the mold may be made loose, as shown in Fig. 3, so as to admit of its removal and the forcing of the prop from the mold when pressed. The mold may also be made to divide longitudinally, so as to remove the props more easily when tightly pressed therein. In some cases I mix a small proportion of powdered plaster-of-paris, earthy whitening, or similar mineral powder to the composition just before molding to promote the handling of the same. Such admixture not only stiffens the composition and renders it easier to handle and mold, but hastens the hardening of the article when molded. The longitudinal ridge or seat usually provided upon the top of the prop at C to receive the wear and pressure of the carriage-bows may be formed in the mold of the same composition as the body A; but I have shown herein a method of combining an india-rubber seat with the upper side of the prop by forming a dovetail tongue and groove, C', in the prop and upon the under side of the rubber seat, by which means the seat can be formed apart from the body of the prop and conveniently secured thereto. In such construction the mold is formed with a tongue, C', as shown in Fig. 4, and the prop is thus formed with a dovetail groove, into which a corresponding tongue upon the rubber seat is forced lengthwise.

The rubber seats are molded and vulcanized in the manner common with india-rubber, and with a tongue adapted to closely fit the groove in the prop, into which it may also be cemented, if required. The top of the seat is shown fluted in Fig. 1, which gives an ornamental appearance.

In lieu of the separate rubber seat, the composition may be formed with a considerable proportion of rubber cement in its texture, and a general elasticity be thus imparted to the whole body of the prop, so as to render it more elastic and durable when in use. Such a prop would be baked in a heated oven, to vulcanize the india-rubber, and the latter be thereby greatly improved in its hardness and durability.

The materials and process of manufacture described herein are exceedingly simple and inexpensive, and enable me to produce a very excellent article at a very low cost.

The props, when thoroughly dried, are painted, varnished, or japanned, to protect them from wear and dampness; but such coating I do not claim, as the same has been heretofore applied to other props.

I am aware of the state of the art shown in United States Patents Nos. 213,129 and 67,371, and that I cannot make specific claim to an elastic strip secured upon the upper side of a top-prop, or to the use of paper as a mere core for a rubber cover; but I am not aware that the body of the top-prop has ever been formed entirely of paper, as I have described, and I therefore claim my construction in the following manner:

1. The top-prop herein shown and described, and formed of paper-pulp united by cement, and molded to form, substantially as and for the purpose set forth.

2. The top-prop herein shown and described, and formed of paper-pulp united by india-rubber cement, and molded to form, and then vulcanized, substantially as and for the purpose set forth.

In testimony whereof I have hereunto set my hand in the presence of two subscribing witnesses.

THEODORE F. LEMASSENA.

Witnesses:
    THOS. S. CRANE,
    L. LEE.